(12) United States Patent
Bittar et al.

(10) Patent No.: US 7,746,078 B2
(45) Date of Patent: Jun. 29, 2010

(54) METHOD AND SYSTEM OF CALCULATING RESISTIVITY OF AN EARTH FORMATION

(75) Inventors: Michael S. Bittar, Houston, TX (US); Guoyu (David) Hu, Houston, TX (US); James Buchanan, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/201,135

(22) Filed: Aug. 29, 2008

(65) Prior Publication Data

US 2008/0315884 A1    Dec. 25, 2008

Related U.S. Application Data

(62) Division of application No. 11/457,371, filed on Jul. 13, 2006, now Pat. No. 7,427,863, which is a division of application No. 10/743,511, filed on Dec. 22, 2003, now Pat. No. 7,098,664.

(51) Int. Cl.
    *G01V 3/20* (2006.01)
(52) U.S. Cl. .................... 324/366; 324/375; 324/357
(58) Field of Classification Search .................. None
    See application file for complete search history.

(56) References Cited

U.S. PATENT DOCUMENTS

| | | | |
|---|---|---|---|
| 3,760,260 A | 9/1973 | Schuster | |
| 3,772,589 A | 11/1973 | Scholberg | |
| 4,468,623 A * | 8/1984 | Gianzero et al. | 324/367 |
| 5,339,037 A | 8/1994 | Bonner | |
| 5,402,069 A * | 3/1995 | Tabanou et al. | 324/351 |
| 5,463,320 A | 10/1995 | Bonner | |
| 5,510,712 A | 4/1996 | Sezginer | |
| 5,852,363 A | 12/1998 | Smits | |
| 6,023,168 A | 2/2000 | Minerbo | |
| 6,191,588 B1 | 2/2001 | Chen | |
| 6,348,796 B2 | 2/2002 | Evans | |

OTHER PUBLICATIONS

P. Cheung, et al. SPWLA 42nd Annual Logging Symposium; Field Test Results of a New Oil-Base Mud Formation Imager Tool; Jun. 17-20, 2001 (pp. 1-14) USA.
J. Lofts, et al. SPWLA 43rd Annual Logging Symposium, A New Micro-Resistivity Imaging Device for Use in Oil-Based Mud, Jun. 2-5, 2002 (pp. 1-14; USA.

* cited by examiner

*Primary Examiner*—Jay M Patidar
(74) *Attorney, Agent, or Firm*—Mark E. Scott; Conley Rose, P.C.

(57) ABSTRACT

Calculating resistivity of an earth formation. At least some of the illustrative embodiments are systems including: a first current source current return (CSCR) pair, said first CSCR pair comprises a first current source and a first current return, the first current return receives current from the first current source; a second CSCR pair, the second CSCR pair disposed along a longitudinal axis of said apparatus from the first CSCR pair, the second CSCR pair comprises a second current source and a second current return, and the second current return receives current from the second current source; and a monitor electrode disposed between the first CSCR pair and the second CSCR pair, a distance between the first current source and the monitor electrode is substantially equal to the distance between the second current source and the monitor electrode, and the monitor electrode monitors a first voltage and a second voltage.

9 Claims, 13 Drawing Sheets

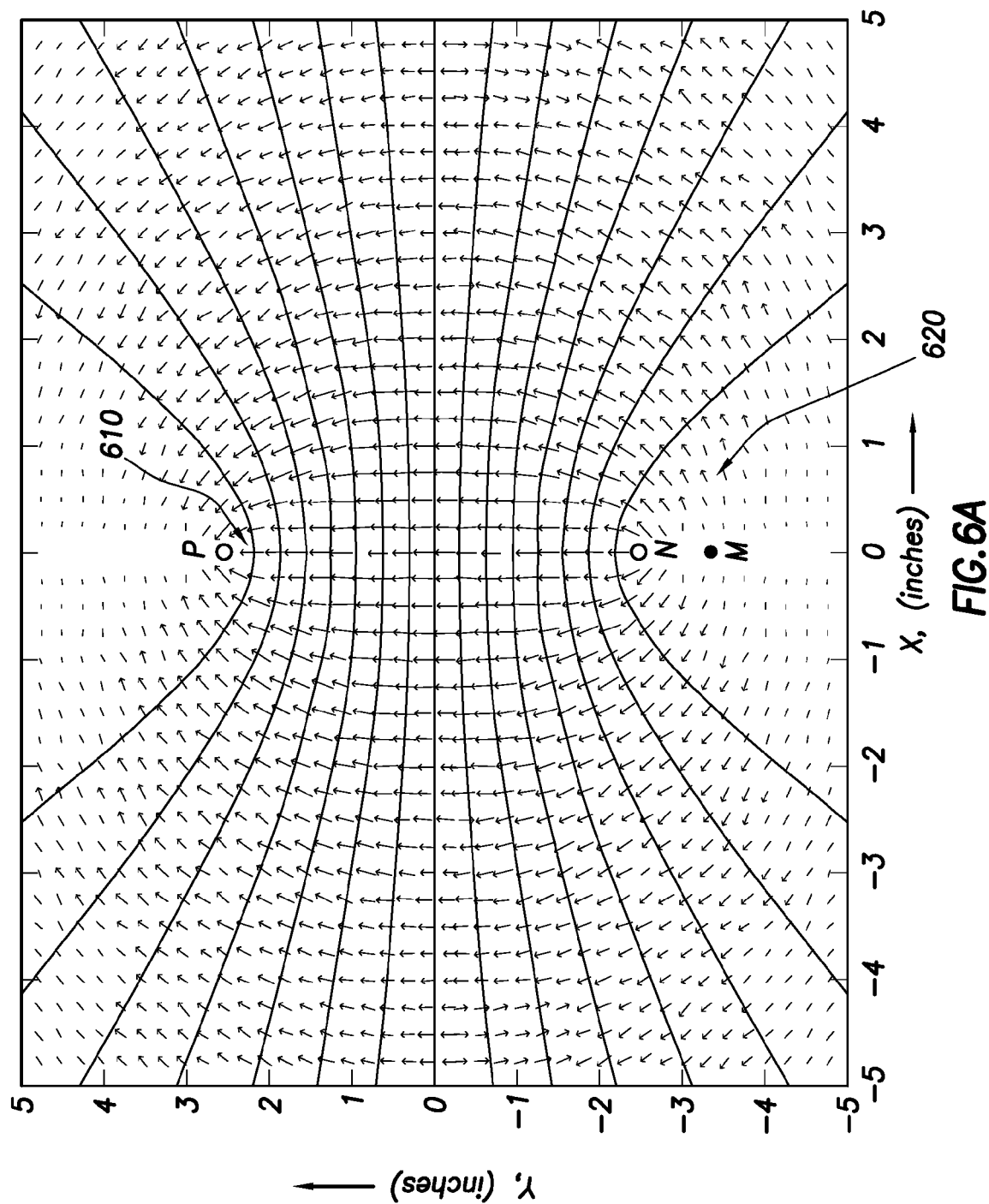

METHOD AND SYSTEM OF CALCULATING RESISTIVITY OF AN EARTH FORMATION

CROSS-REFERENCE TO RELATED APPLICATIONS

This application is a divisional of application Ser. No. 11/457,371, entitled "A Multi-Mode Oil Base Mud Imager" filed Jul. 13, 2006 and now U.S. Pat. No. 7,427,863, which application is a divisional application Ser. No. 10/743,511, entitled "A Multi-Mode Oil Base Mud Imager" filed Dec. 22, 2003 now U.S. Pat. No. 7,098,664. Both of the related applications are incorporated by reference herein as if reproduced in full below.

STATEMENT REGARDING FEDERALLY SPONSORED RESEARCH OR DEVELOPMENT

Not Applicable.

BACKGROUND OF THE INVENTION

In drilling a borehole in the earth, such as for the recovery of hydrocarbons or for other applications, it is conventional practice to connect a drill bit on the lower end of an assembly of drill pipe sections which are connected end-to-end so as to form a "drill string." FIG. 1 includes a drilling installation having a drilling rig 10 at the surface 12 of a well, supporting a drill string 14. The drill string includes a bottom hole assembly 26 (commonly referred to as a "BHA") coupled to the lower end of the drill string 14. The BHA includes the drill bit 32, which rotates to drill the borehole. As the drill bit 32 operates, drilling fluid or mud is pumped from a mud pit 34 at the surface into the drill pipe 24 and to the drill bit 32. After flowing through the drill bit 32, the drilling mud rises back to the surface, where it is collected and returned to the mud pit 34 for filtering. The mud, in the process of filtering into the formation, leaves a mudcake on the wall of the hole.

Modern oil field operations demand a great quantity of information relating to the parameters and conditions encountered downhole. Such information typically includes characteristics of the earth formations traversed by the wellbore, in addition to data relating to the size and configuration of the borehole itself. The collection of information relating to conditions downhole, which commonly is referred to as "logging," can be performed by several methods.

Logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

Ordinarily, a well is drilled vertically for at least a portion of its final depth. The layers, strata, or "beds" that make up the earth's crust are generally substantially horizontal, such as those labeled 20, 21, and 22 in FIG. 1. Therefore, during vertical drilling, the well is substantially perpendicular to the geological formations through which it passes. A sudden measured change in resistivity by a resistivity tool generally indicates the presence of a bed boundary between layers. For example, in a so-called "shaley" formation with no hydrocarbons, the shaley formation has a very low resistivity. In contrast, a bed of oil-saturated sandstone is likely to have a much higher resistivity.

Focusing electrode systems were developed to improve resistivity log response opposite thin beds in high-resistivity formations with low-resistivity borehole fluids. Their major feature is the presence of auxiliary current electrodes above and below the primary current electrodes. These auxiliary electrodes develop potential barriers that cause the primary current to flow into the formation rather than flowing along the borehole. Current flow is focused to travel perpendicular to the borehole wall, as shown in FIG. 2.

More recently, oil-base and synthetic drilling fluids were developed and have become popular to reduce drilling risks and increase efficiency. For example, many wells in locations such as the Gulf of Mexico and the North Sea cannot be drilled as economically using water-based mud technology because of wellbore stability problems. The oil-base muds are highly non-conductive, however, with a resistivity of about $10^3$-$10^6$ ohm-m.

Performance of many known micro-resistivity tools in these non-conductive oil-based mud systems was seriously degraded. The high-resistance drilling fluid prevents the flow of current. To solve this problem, a resistivity tool may be placed against the borehole wall, but an imperfect contact or high-resistance mud cake prevents any current flow that would occur perpendicular to the borehole wall. Put in terms of an electrical circuit, the mud cake resistivity $R_m$ (which may be approximated as having infinite resistivity) is in series with the formation resistivity $R_f$ as shown in FIG. 3A. The total circuit resistance may be considered about infinite for this purpose, effectively preventing current flow. Without a flow of current, no resistivity measurement can be made and thus measurements from a current emitting resistivity tool were rendered either useless or much less reliable. It was thought that the advantages of microresistivity borehole imagers to collect information regarding the borehole might be lost when using non-conductive drilling fluids.

Resistivity tools with current flows parallel to the measurement electrodes were developed to overcome this problem. When the current flows parallel to the measurement electrodes along the borehole wall, the electrical circuit analogy is that of a parallel circuit as shown in FIG. 3B. As can be appreciated by those of ordinary skill in the art, a circuit of mud cake resistivity $R_m$ and formation resistivity $R_t$ in parallel results in a circuit resistivity about equal to that of the formation resistivity $R_t$.

Two resistivity tools developed for use with oil-based (high resistivity) drilling fluid are disclosed in U.S. Pat. Nos. 6,191, 588 and 6,348,796, each of which are incorporated by reference. Although the following describes what is believed the salient features of the tools described in these patents, it should be realized that only a shorthand description is contained herein and the patents contain the more full, detailed and possibly more accurate description of each tool design.

U.S. Pat. No. 6,191,588 to Chen describes a resistivity tool designed for use in oil-based mud that places at least two pairs of voltage electrodes between at least one current source and current return on a non-conductive pad, as shown in present FIG. 4. The basic theory of operation underlying the Chen patent is that with an infinitely long pad in perfect contact with formation, the current flow is parallel to the pad in front of the voltage monitors. This allows operation of the device in the oil base mud, in contrast to a focused resistivity tool. Chen then asserts that finite pad size and imperfect pad contact do not significantly impede the parallel flow of current in front of the monitor electrodes and thus the ability of the tool disclosed in the Chen patent to make meaningful measurements.

U.S. Pat. No. 6,348,796 to Evans et al. describes a resistivity tool suitable for use an oil-base mud system. Referring to present FIG. 5 (corresponding to FIG. 4 of Evans), a single measure electrode is maintained at a voltage V. Two guard electrodes flank the measurement electrode and are maintained at voltage below V. The pad or body of the instrument is maintained at a voltage above that of V. This results in a current flow from the measure electrode that is not perpendicular to the borehole wall, a phenomenon that is known as defocusing the current flow. As described by Evans, because of defocusing of the current beam near the measure electrode, the Evans device claims to be relatively insensitive to the presence of borehole fluid between portions of the electrode and the formation.

An alternate resistivity tool is desired that provides accurate measurements of formation resistivity in a non-conductive mud system. Ideally, such a tool would be more simple and more accurate than existing designs.

BRIEF DESCRIPTION OF THE DRAWINGS

For a more detailed description of the preferred embodiment of the present invention, reference will now be made to the accompanying drawings, wherein:

FIG. 6A is a point source model of an uncompensated design in accordance with one embodiment of the invention;

DETAILED DESCRIPTION OF THE PREFERRED EMBODIMENT

A multi-mode oil base mud imager and related methods are disclosed. The invention, however, has a number of different aspects, each of which has features that may be separately patentable.

The invention takes advantage of the natural defocusing of a current flow as it travels from a source to a sink. FIG. 6A uses a point source model to describe a principle underlying embodiments of the invention. N is a current source, P is a current return and M is a monitor electrode. A set of current lines 610 depict current as it travels directly from current source N to current return P. Current line 620 shows the current as it travels from current source N to current return P but as detected from monitor electrode M. Current travels along line 620 from current source N to current return P regardless whether monitor electrode M is present but without the presence of monitor electrode M, the characteristics of current line 620 are not detected.

Figure 1:
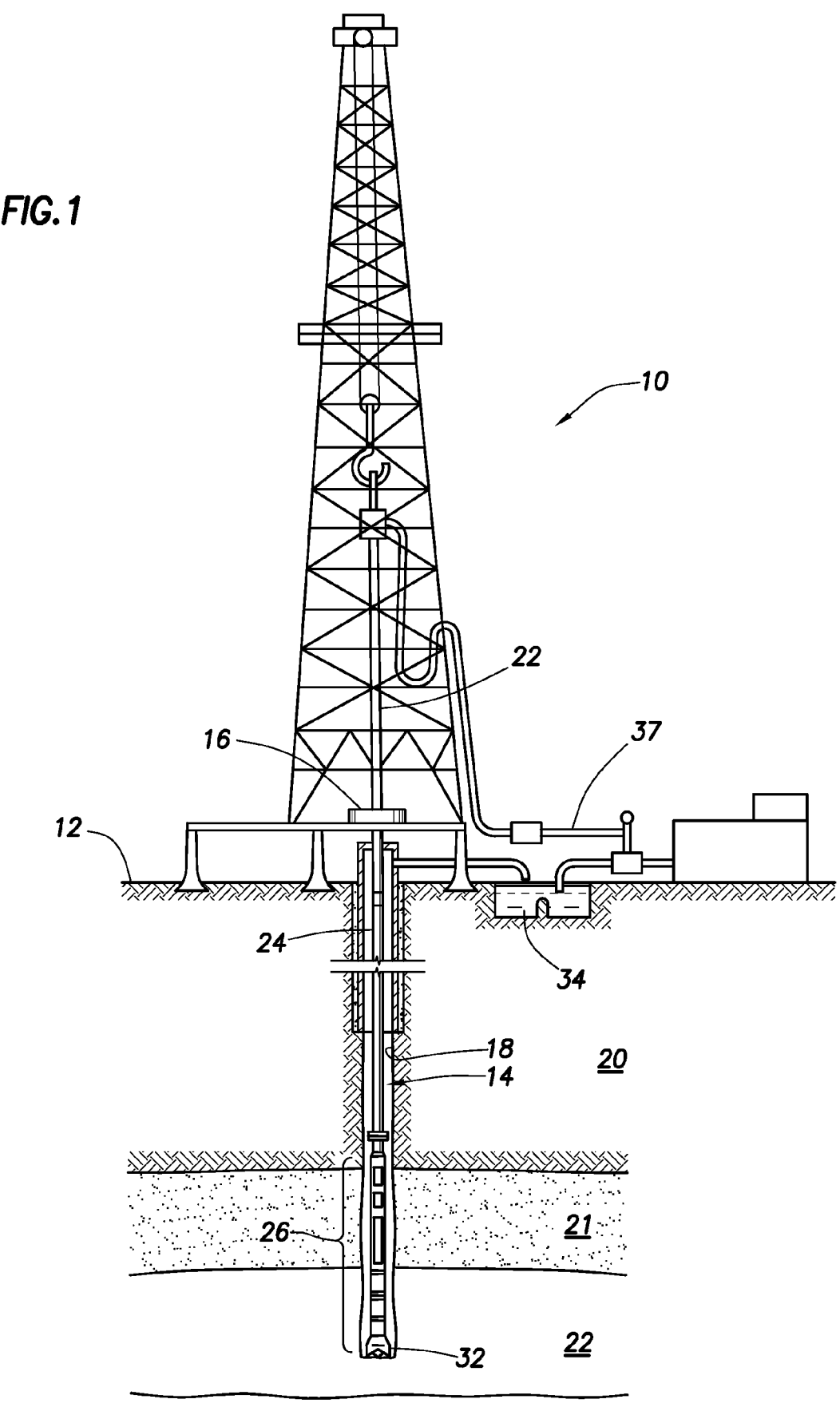
FIG. 1 is a drilling rig for a vertical well.
Figure 3A:
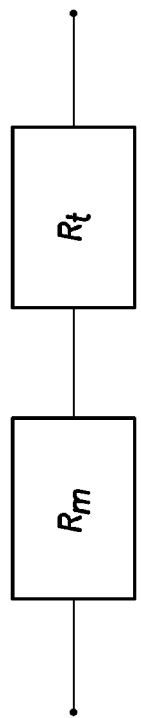
FIG. 3A is a series electrical circuit.
Figure 3B:
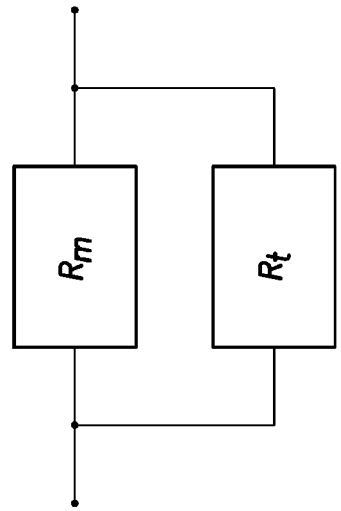
FIG. 3B is a parallel electrical circuit.
Figure 2:
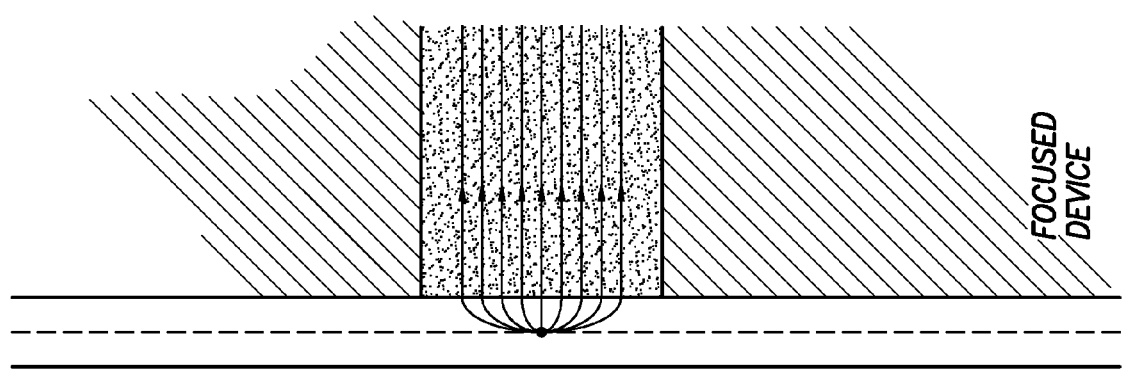
FIG. 2 is a set of focused current lines used for applications having highly conductive drilling fluid.
Figure 4:
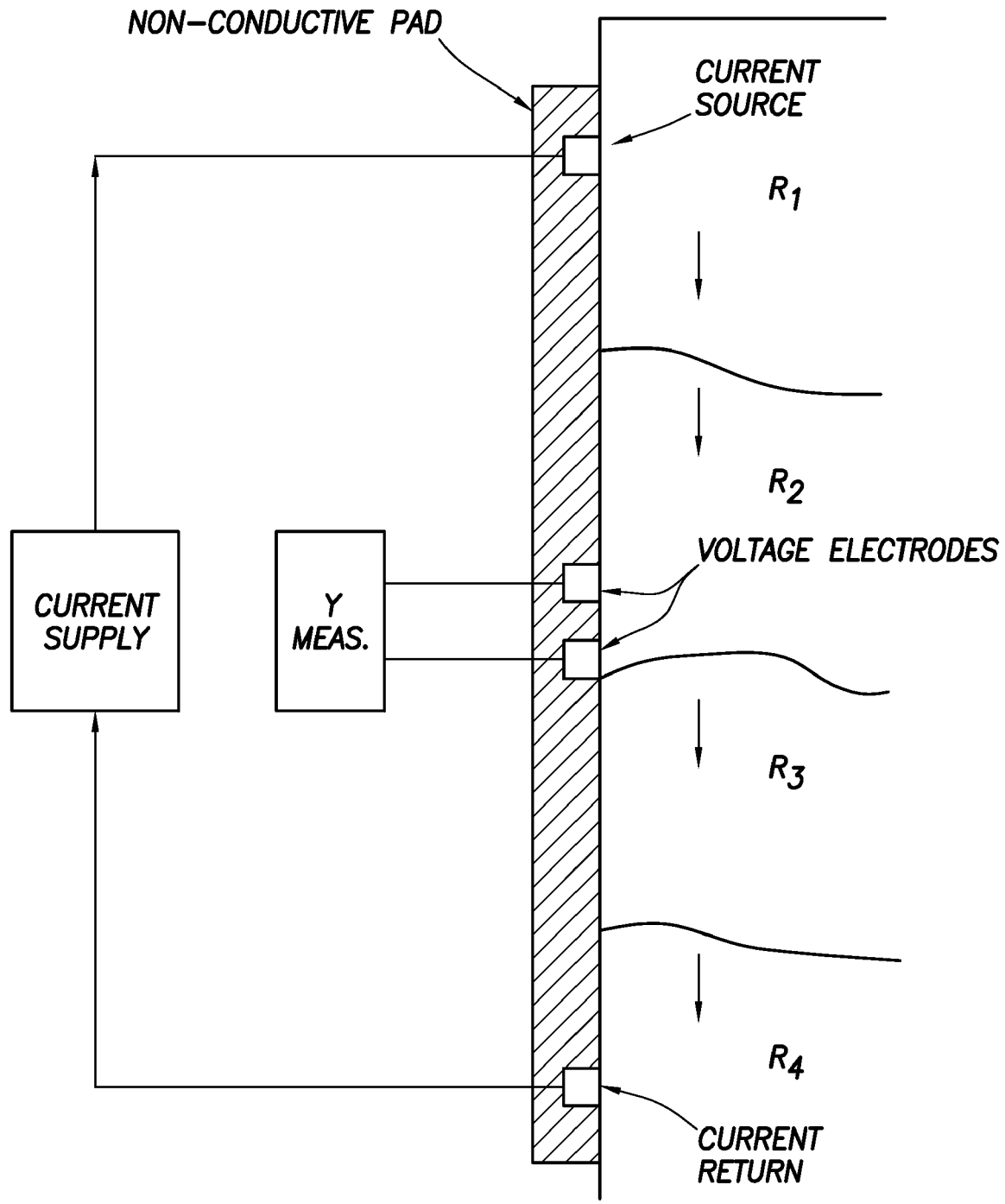
FIG. 4 is a first prior art design for a resistivity tool for use in an oil based system.

At an intersection of each current line and a borehole wall (not shown), each of current lines 610 and 620 can be can be thought of as a current component perpendicular to the borehole wall and a component parallel to the borehole wall. Current flow perpendicular to the borehole wall approximates the high resistivity circuit of FIG. 3A, while current flow parallel to the borehole wall approximates the low resistivity circuit of FIG. 3B. Consequently, a component of current lines 610 and 620 should be parallel to the borehole wall to evaluate the current sent from the current source N to the current return P. Placement of the monitor electrode M below the current source N (or above the current return P) means that the current line passing through the monitor electrode M is at a more severe angle to the borehole wall than the angle of current line 610 to the borehole wall. Consequently, current detected by monitor electrode M is more effective at penetrating into the formation surrounding the wellbore in oil-based mud and a more accurate resistivity measurement results. In addition, it can be seen that current line 620 travels a much larger distance into the formation than current lines 610. Placement of the monitor electrode M below current source N, and not between current source N and current return P, provides a much deeper measurement into the formation than is present for the current flowing between current source N and current return P.

Figure 6B:
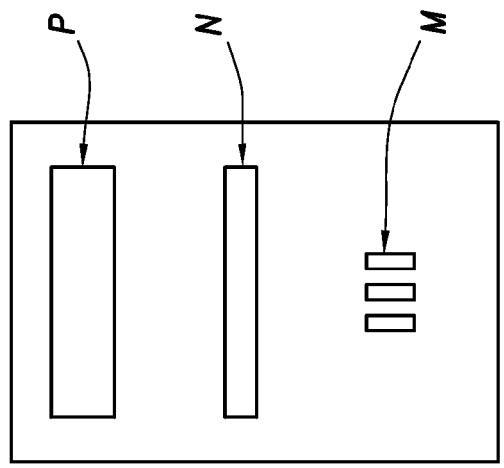
FIG. 6B is one embodiment of a tool design according to the model of FIG. 6A.
Figure 5:
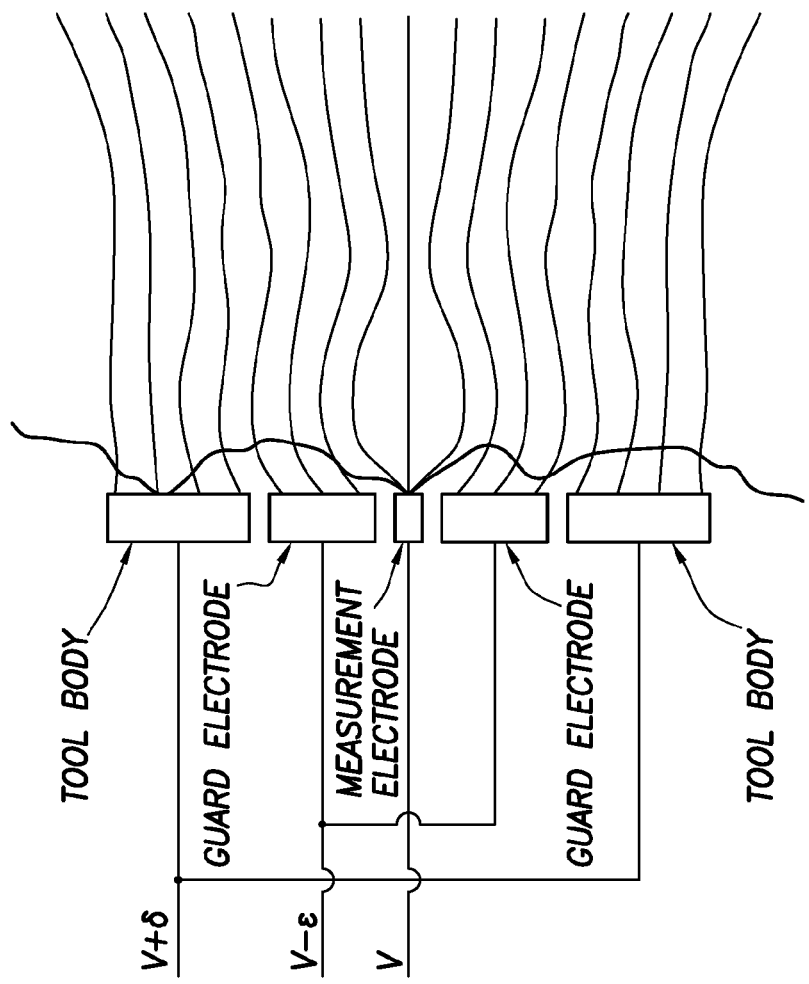
FIG. 5 is a second prior art design for a resistivity tool for use in an oil based system.

According to one embodiment of the invention, monitor electrode M may comprise a series of monitor electrodes as illustrated in FIG. 6B, so long as the series of monitor electrodes are placed below current source N. In another embodiment of the invention the monitor electrode M may comprise a series of monitor electrodes so long as the series of monitor electrodes are placed above current return P. Referring to FIG. 6B, in one embodiment of the invention, a current at a frequency of up to about 100 KHz would be generated at the current source N. A potential may be measured at the monitor electrode M with respect to a common reference (e.g., a ground) at a distance from the current source P, the current return N, and the monitor electrode M. The potential measured at the monitor electrode M is divided by the total injected current from current source N, and the result multiplied by a factor K (the tool constant well known by one having ordinary skill in the art) to calculate apparent resistivity detected by the tool. Although the embodiment of FIG. 6B has a conductive strip or a conductor for current source M and for current return P, other embodiments of the invention may have one or more buttons or one or more point sources for current source M and/or for current return P. Also, monitor electrode M may comprise any suitable construction such as a conductive strip or one or more buttons or pins.

Figure 7B:
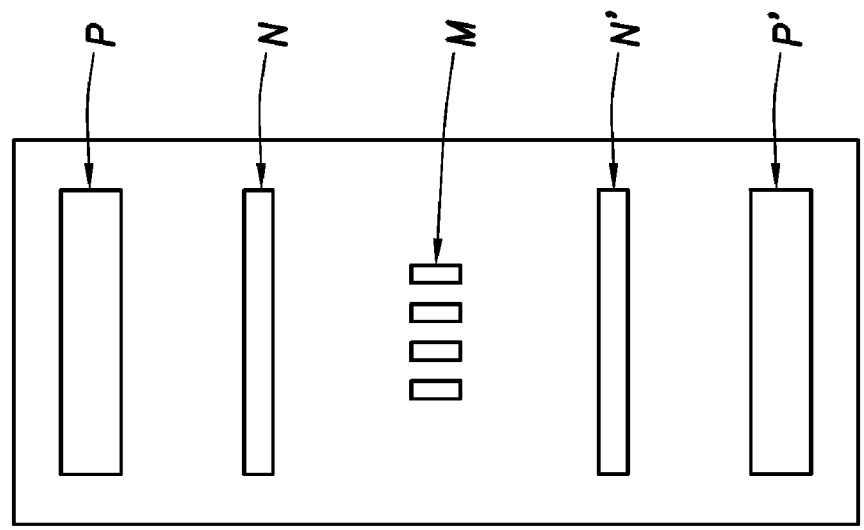
FIG. 7B is one embodiment of a tool design according to the model of FIG. 7A.
Figure 7A:
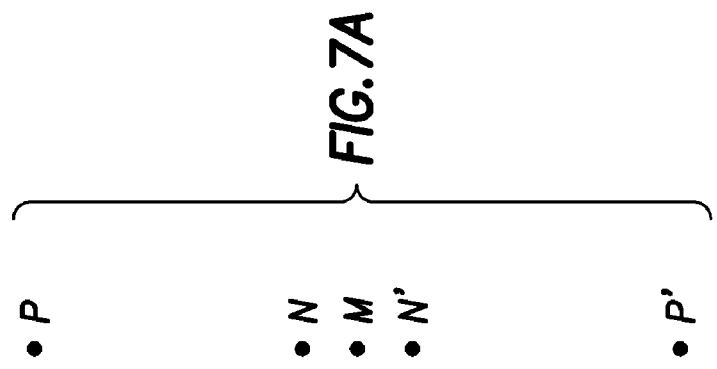
FIG. 7A is a point source model of a compensated design in accordance with one embodiment of the invention.

FIG. 7A uses the point source model (i.e., uses point sources for current sources, current returns and for the monitor electrode). As illustrated in FIG. 7A current source N, current return, P and monitor electrode M. Unlike the embodiment of FIG. 6A, a tool built in accordance with the principles of FIG. 7A is compensated (symmetric). An uncompensated tool results in a skewed resistivity log (well known to one having ordinary skill in the art), and requires inversion or processing (also well known to one having ordinary skill in the art) to compensate for the lack of compensation. A compensated tool design avoids this extra processing. To obtain a symmetric design, as illustrated in FIG. 7A, another current source, N', and current return, P', are added with a monitor electrode M as the symmetry point. In one embodiment of the invention, in order to produce a symmetric response, for a particular depth of investigation, the two current sources (N and N') create currents with equal magnitude and frequency and are located at equal distances from monitor electrode M. In particular, the distance between current source N and monitor electrode M is substantially equal to the distance between current source N' and monitor electrode M. A design for a compensated (symmetric) tool built in accordance with the principles of the invention is shown in FIG. 7B and operates in a similar manner as the tool of FIG. 6A (except for simplified processing).

In one embodiment of the invention, current sources N and N' may transmit currents concurrently. If current sources N and N' transmit currents I and I' concurrently and the voltage measured at the monitor electrode M is V, then the formation resistivity, R, may be calculated as $$R = K\frac{V}{I_1 + I_2} \text{ where } K \text{ is the tool constant} \quad [1]$$

In one embodiment of the invention, current sources N and N' may transmit currents consecutively. If current source N transmits current $I_1$ and current source N' transmits current $I_2$ consecutively, and the corresponding voltages measured for each of these currents at the monitor electrode M are $V_1$ and $V_2$ respectively, the formation resistivity, R, may be calculated as $$R = K\frac{V_1 + V_2}{I_1 + I_2} \text{ where } K \text{ is the tool constant} \quad [2]$$

Figure 8:
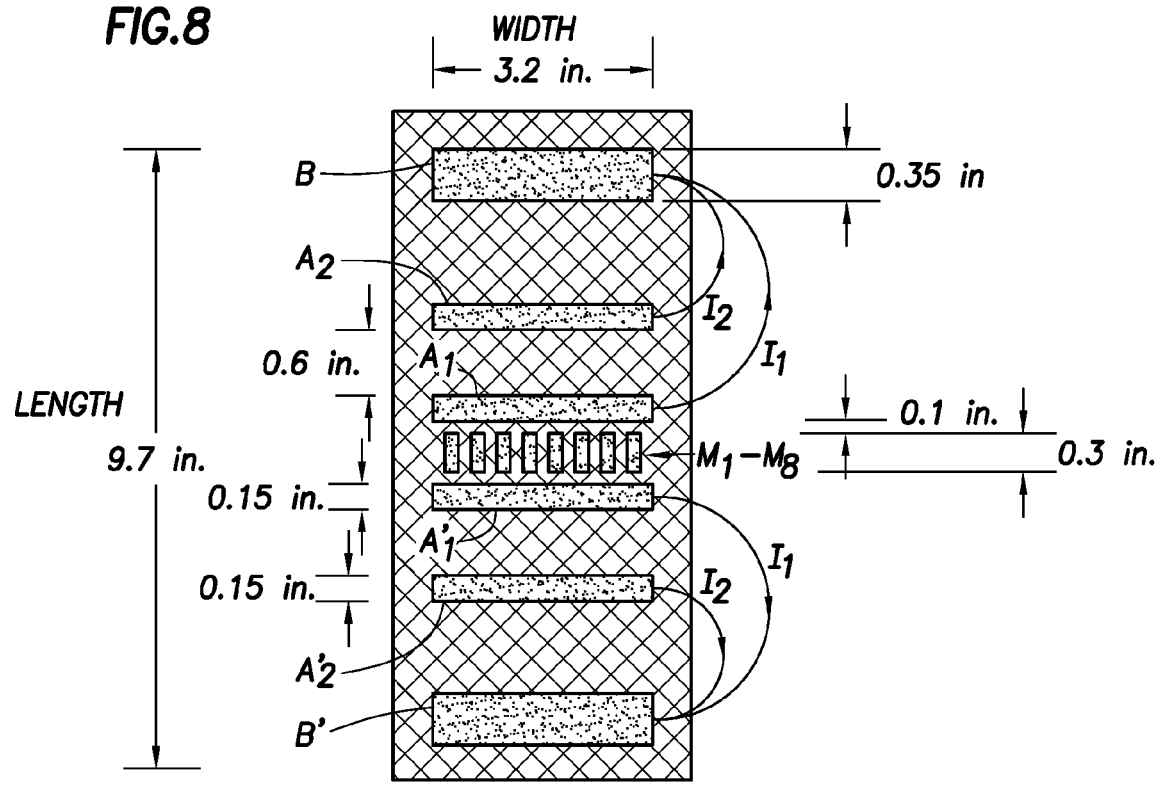
FIG. 8 is a two-mode, compensated tool according to one embodiment of the invention.

A diagram of a tool design according to one embodiment of the invention is shown in FIG. 8. As illustrated in FIG. 8, the tool includes four current sources A1, A2, A1', A2', two current returns B, B', and an array of monitor electrodes M1-M8. The first set of current sources $A_1$ and $A_1'$ each generate equal first currents $I_1$ and are spaced equally from respective current returns B and B'. A second set of current sources $A_2$ and $A_2'$ each generate equal second currents $I_2$ and are spaced equally from respective current returns B and B'.

A problem with conventional resistivity imagers adapted for use in an oil base system is an inability to accurately measure resistivities at multiple depths of investigation surrounding the borehole. Conventional resistivity tools are imaging tools that provide the apparent resistivity at a single depth and different locations around the borehole circumference. The inclusion of two sets of transmitters $A_1$ and $A_1'$, and $A_2$ and $A_2'$ in the tool of FIG. 8, however, enables two modes of operation (e.g., a first mode of operation and a second mode of operation), wherein each mode of operation corresponds to a particular depth of investigation into the formation from the borehole. Although the embodiment of FIG. 8 illustrates two modes of operation, alternate embodiments may have multiple sets of current sources and current returns for investigating multiple depths into the formation. In one embodiment of the invention, the frequency of the current for each mode of investigation may be the same, or the frequency of the current may be different. For each mode of operation, potentials at the monitor electrodes M1-M8 are measured. These potentials are then divided by the total transmitted current to calculate apparent resistivity (well known by one having ordinary skill in the art). For a given location in the borehole, the first mode has a shallow depth of investigation into the formation surrounding the borehole. In the shallow mode, currents of equal magnitude are transmitted from current sources $A_1$ and $A_1'$. The current from current source $A_1$ returns to current return B and the current from current source $A_1'$ returns to current return B'. Potentials at the monitor electrodes M1-M8 are then measured and the resistivity of the formation is calculated using these measurements.

At the given location in the borehole, the second mode has a deeper depth of investigation into the formation surrounding the borehole. In the second mode, currents of equal magnitude are injected from current sources $A_2$ and $A_2'$. The current from current source $A_2$ returns to current return B and the current from current source $A_2'$ returns to current return B'. Potentials at the monitor electrodes M1-M8 are then measured and the resistivity at the deeper depth of investigation is calculated. As explained earlier, the transmission of current into the formation, and the subsequent calculation the resistivity of the formation may be done by transmitting the current either simultaneously or concurrently.

Figure 16:
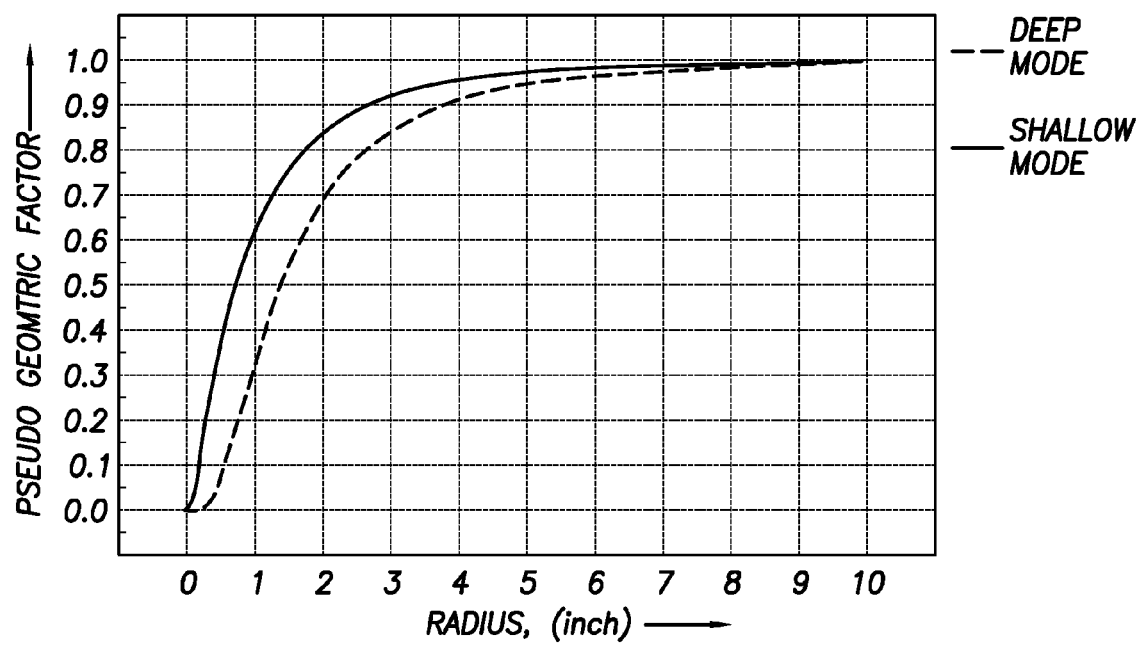
FIG. 16 is a plot of the pseudo geometric factor of the tool of FIG. 10.

FIG. 16 shows the pseudo-geometric factors (PGF) of the "deep" and "shallow" modes. Along the y-axis is shown the PGF from 0.0 to 1.0. Along the x-axis is depth of investigation (radius), expressed in inches from the borehole wall. PGF is an industry standard that defines the depth of investigation. More specifically, the depth of investigation for the "deep" and "shallow" modes of operation may be defined from the PGF curve by examining where each curve crosses the 0.5 PGF level. The depth of investigation for the shallow mode corresponds to about three-quarters of an inch into the formation from the borehole wall. The depth of investigation for the deep mode corresponds to about 1 and ⅓ inches into the formation from the borehole wall. Of course, depths of investigation will vary depending on tool design and so each tool may have its own PGF chart depending upon the placement of the current source, the current return and the monitor electrode.

Although tools of different sizes and relative positionings can be constructed, suitable measurements and spacings for the current sources, current returns, and monitor electrodes are included in FIG. 8. The length and lateral width of the tool are labeled. In one embodiment of the invention, the lateral (width) spacing between each of the monitor electrodes is 0.15 to 0.2 inches. In one embodiment of the invention, the body of the tool may be made from a non-conductive material such as fiberglass, in other embodiments of the invention suitable materials such as berrilium copper may be used for the tool body, with the current source, the current return and the monitor electrode suitably insulated from the tool body.

The tool of FIG. 8 may be adapted for either wireline or LWD environments. In the wireline environment, the tool may be pressed up against the borehole wall in the well-known manner for many downhole tools, as is generally shown in FIG. 9.

Figure 9:
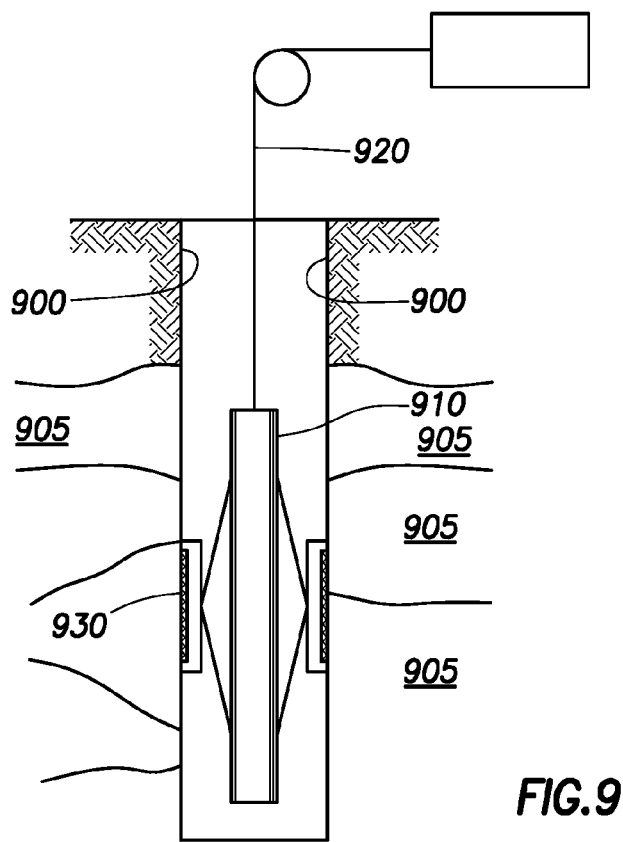
FIG. 9 is a cut-away side view of one embodiment of the invention as implemented in a wireline environment.

FIG. 9 illustrates a borehole 900 drilled through layers of formation 905. A sonde 910 attaches to a wireline 920. Resistivity tool 930 presses against the borehole wall 900. It should be appreciated that one or more sets of current sources, current returns, and monitor electrodes may be placed against the borehole wall. The current sources, current returns, and monitor electrodes may be placed on one or more pads for example, and pressed against the borehole wall by an arm. Because a tool built according to the principles of the invention is preferably an imaging tool and therefore measures at least 60% of the borehole circumference for a given cross-sectional plane in the borehole, more than one (and preferably six) pads with current sources, current returns and monitor electrode sets may be placed against the borehole wall in different orientations so as to measure 360 degrees of the borehole wall in the given plane.

In an LWD environment, the imaging tool may be placed in any suitable location in the tool string of the bottom hole assembly (BHA). In one embodiment of the invention, the current source, the current return, and the monitor electrode may be placed on a collar or stabilizer blade that may be used to press the current source, the current return, and the monitor electrode, against the borehole wall.

Figure 10:
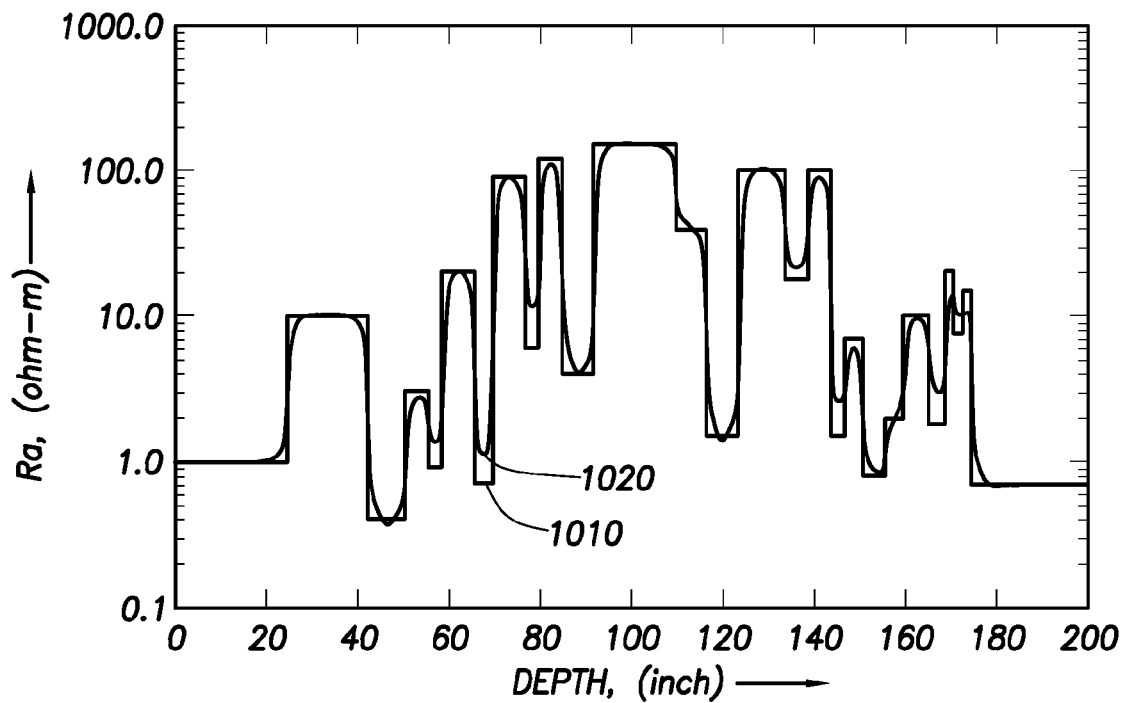
FIG. 10 is a plot of a modeled tool response for the shallow mode of operation for the tool of FIG. 8.

Referring to FIG. 10, a plot of a modeled tool response for the shallow mode of operation is shown. Along the x-axis is the depth of the borehole in inches. Along the y-axis is the formation resistivity in units of ohms-meter. A first line 1010, comprised of straight segments, shows the actual depth of, i.e. ideal measurement for, bed boundaries and the resistivity of each formation. A second line 1020 represents the response of a tool built according to the design of FIG. 8 moving through a multi-layered formation.

Figure 11:
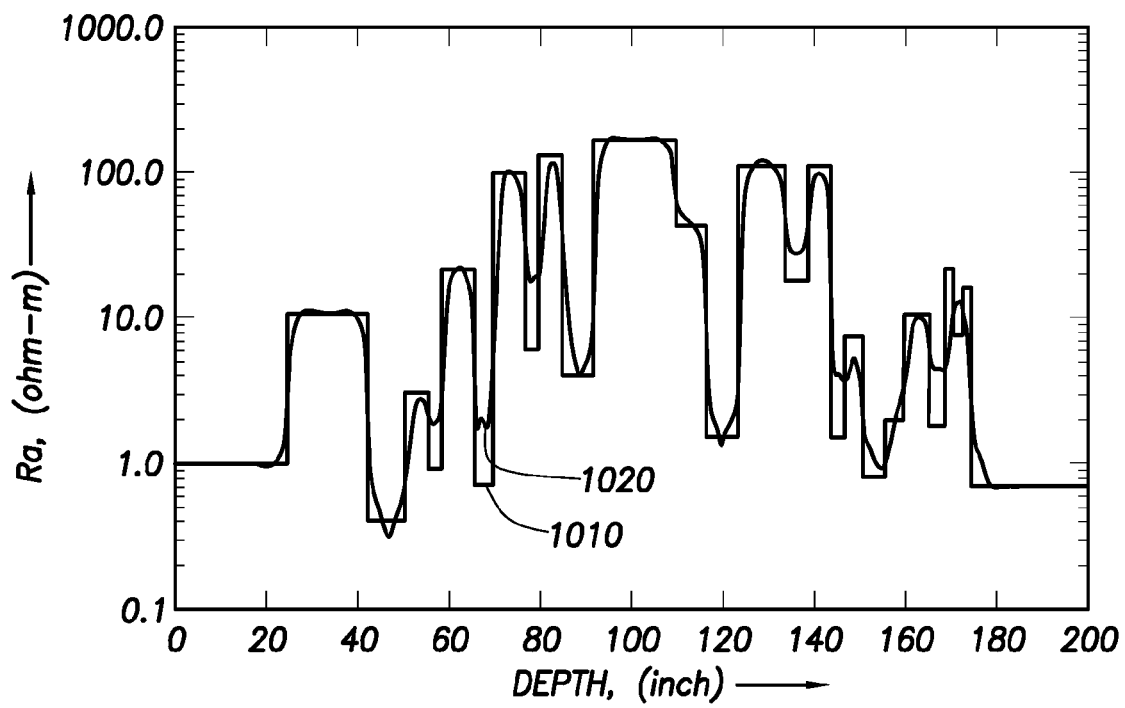
FIG. 11 is a plot of a modeled tool response for the deep mode of operation for the tool of FIG. 8.

Referring to FIG. 11, a plot of the tool response for the deeper mode of operation is shown, using the same formation. The first line, 1010, is the same as shown in FIG. 10. A second line, 1120, represents the tool response for the deeper mode of investigation. Although the plot is still relatively accurate, comparison with FIG. 10 shows the tradeoff between depth of investigation and vertical resolution. As illustrated in FIG. 10, deep measurements gives resistivity at a greater depth of investigation, however, the vertical resolution is not as good as compared with shallow measurements.

Without a stand-off created by, e.g., a mud cake, the differences in the plots for the shallow and deep modes differ primarily because of shoulder effects. However, the value of the plot in the main portion of a thick formation layer is the same.

Figure 12:
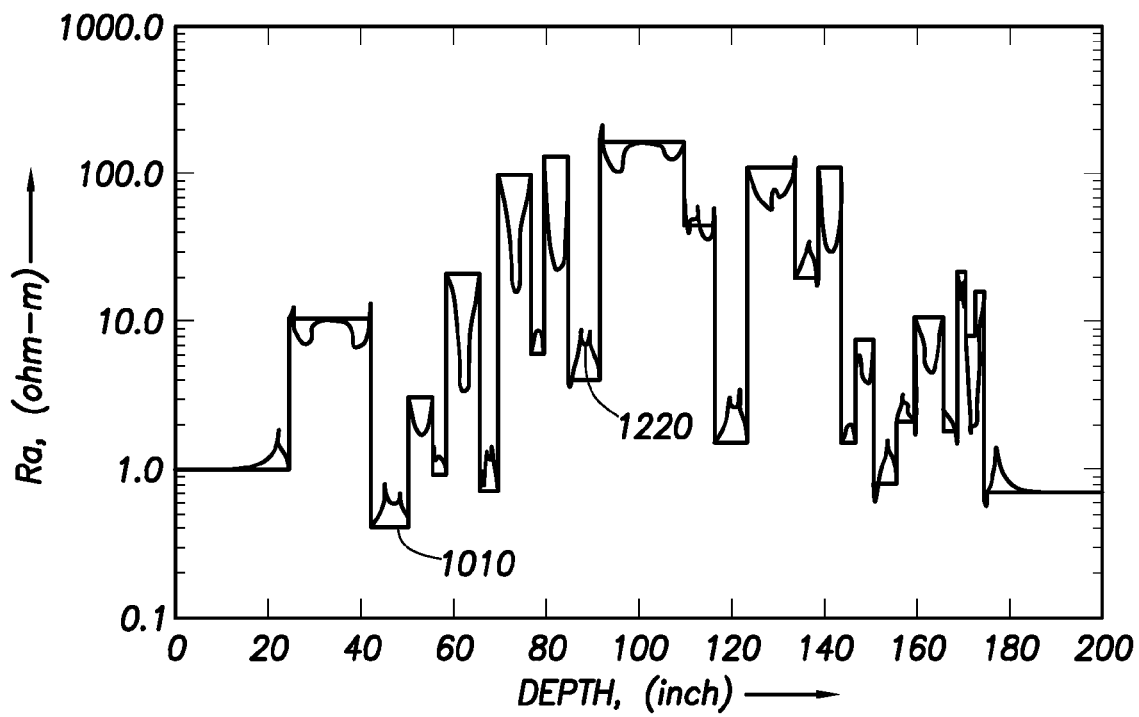
FIG. 12 is a plot of a modeled tool response for a prior art tool.

Referring to FIG. 12, the first line 1010 is the same as shown in FIG. 10. A second line, 1220, represents the response for a conventional tool measuring the formation used to generate FIGS. 10 and 11. As can be seen, the tool response of the conventional resistivity tool does not follow the true resistivity as closely as the tool response for either the shallow mode or for the deep mode for one embodiment of the invention (as shown in FIGS. 10 and 11). This inaccuracy may lead one to erroneously conclude the resistivities and/or the location of the boundaries of the formations.

Figure 13:
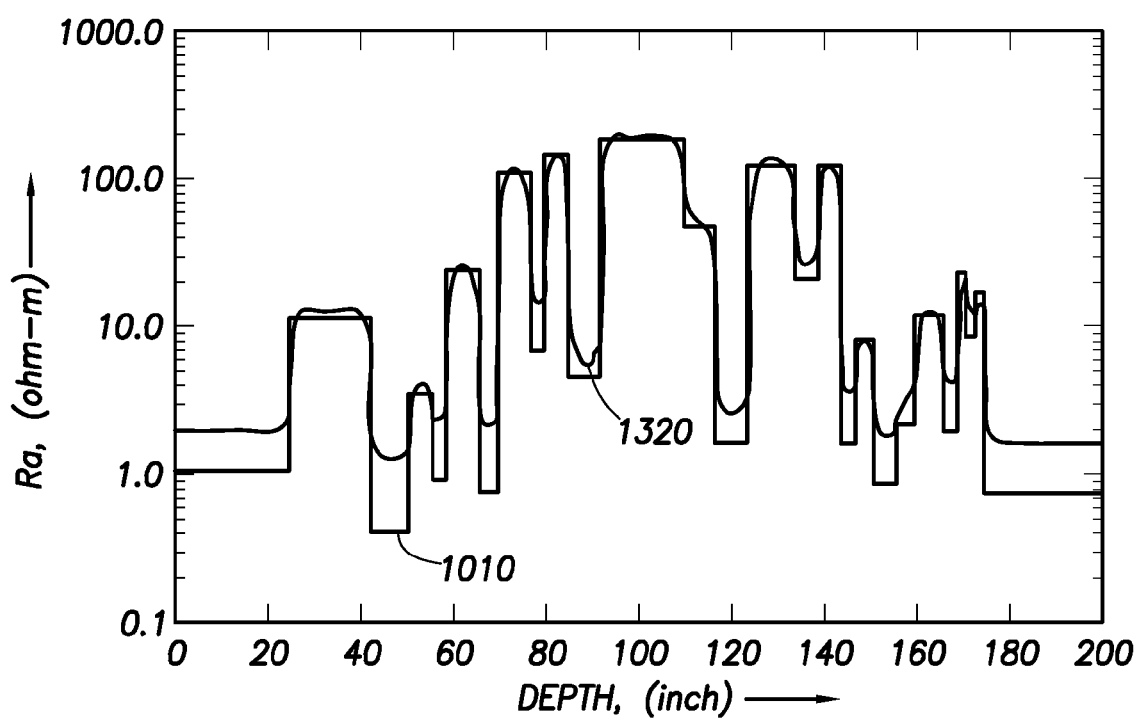
FIG. 13 is a plot of a modeled tool response for the shallow mode of operation for the tool of FIG. 8 with a 1/32 inch stand off.

Referring to FIG. 13, a plot is shown of the tool response for a tool built according to the invention operating to the shallow mode. First line 1010 is shown with the tool response line, 1320, also being shown. The tool response of FIG. 13 is for the same formation as for FIG. 10, but there is a ⅟32 inch standoff formed by a 1000 ohm-m mud cake between the electrodes and the borehole wall.

Figure 14:
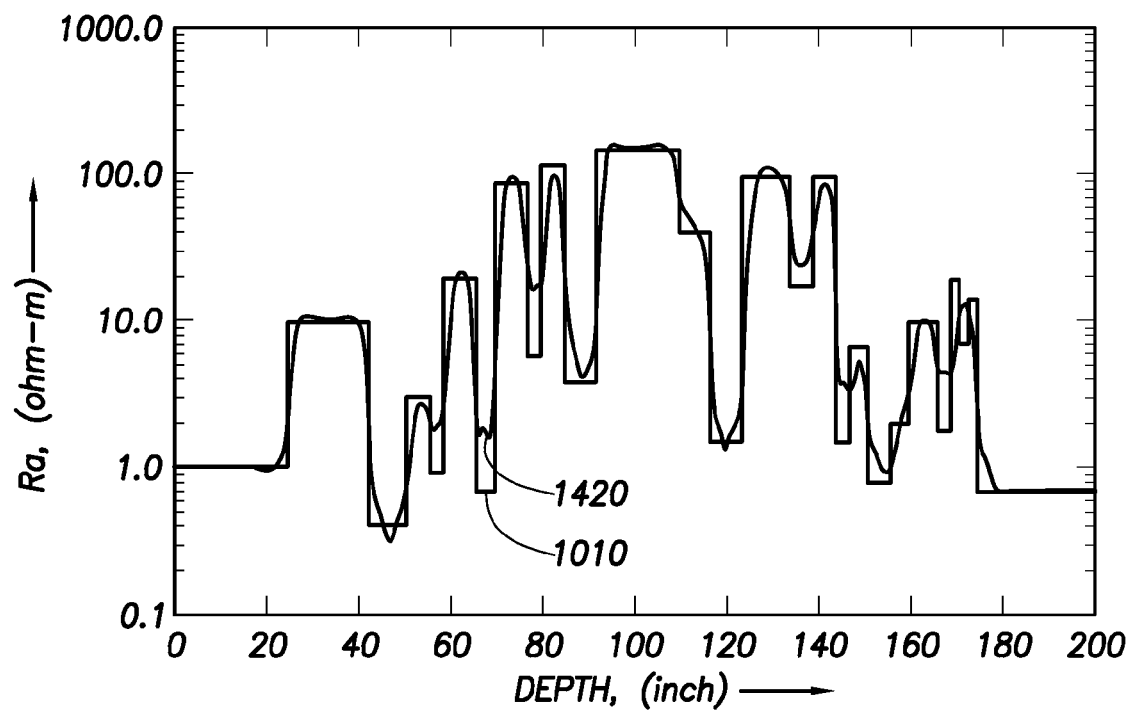
FIG. 14 is a plot of a modeled tool response for the deep mode of operation for the tool of FIG. 8 with a 1/32 inch stand off.

Referring to FIG. 14, a plot is shown of the tool response for a tool built according to the one embodiment of the invention operating in the deep mode of operation. First line 1010 is shown with the tool response line, 1420, also being shown. The tool response is for the same formation as for FIG. 10 but there is a ⅟32 inch standoff formed by a 1000 ohm-m mud cake between the electrodes and the borehole wall.

Figure 17:
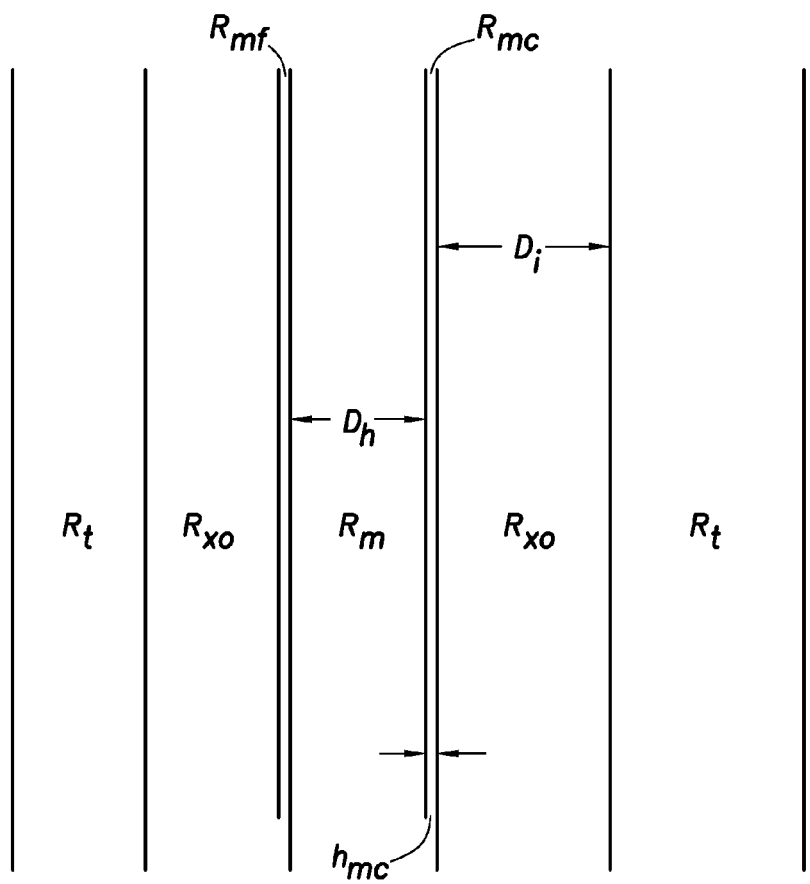
FIG. 17 is a side view illustration of various regions surrounding a borehole.

Referring to FIG. 17, a number of radial profiles are identified. The area inside the well bore filled with drilling mud can be referred to as $D_h$ and has a resistivity of the drilling mud, $R_m$. In a non-conductive mud system that attempts to measure formation resistivity, resistivity measurements of the mud itself are to be avoided to the extent possible, although standoff from the borehole may result in measurement of the drilling fluid. Next to the diameter of drilling mud $D_h$ is the thickness $h_{mc}$ of the mudcake, and has a resistivity of $R_{mc}$. Resistivity measurements of the mudcake, although undesirable, are unavoidable when it is present.

The next general area of investigation is the region within the surrounding formation that has been invaded by the drilling mud. This diameter of invasion can be referred to as $D_i$, because a resistivity measurement in this region will produce a resistivity value of approximately $R_{xo}$, which is the resistivity of the invaded zone. The third possible region is the formation which has not been invaded by drilling mud. A resistivity measurement of this region will yield the true resistivity value of the formation, $R_t$. As one skilled in the art will understand, the diameters, $D_h$ and $D_i$ will vary depending upon many factors, including the characteristics of the formation and the drilling mud, the time that has elapsed from when that portion of the wellbore was drilled, and the like. While information regarding imaging of the borehole in non-conductive mud is useful for the purposes of evaluation, one can modify an imaging tool to have variable depth of investigation to measure $R_{xo}$ and calculate $h_{mc}$, the thickness of the mud cake. Thus, it is important to design the resistivity tool to have multiple depths of investigation to measure this resistivity.

Figure 18:
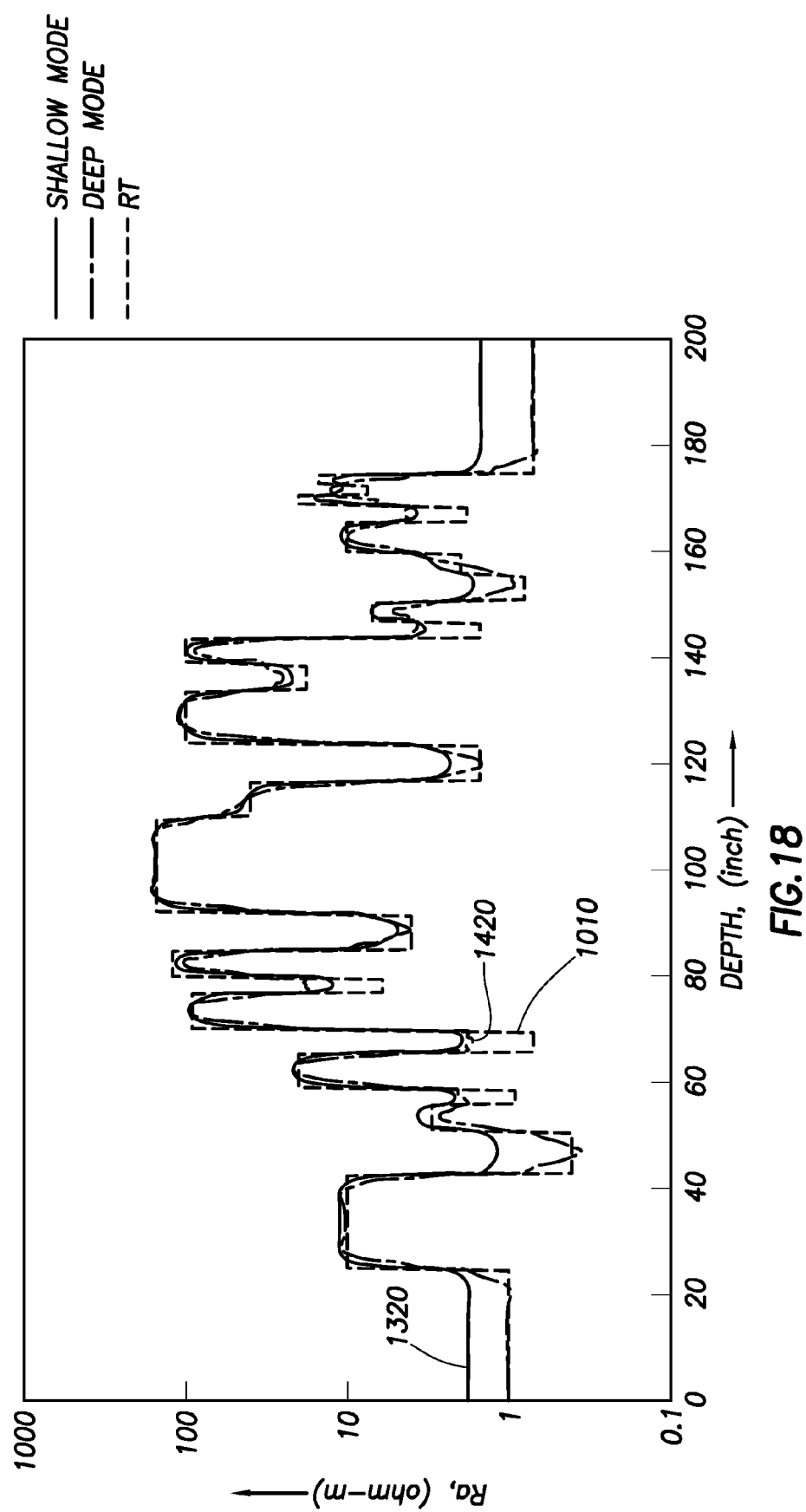
FIG. 18 is a composite of the graphs of FIGS. 13 and 14.
Figure 20:
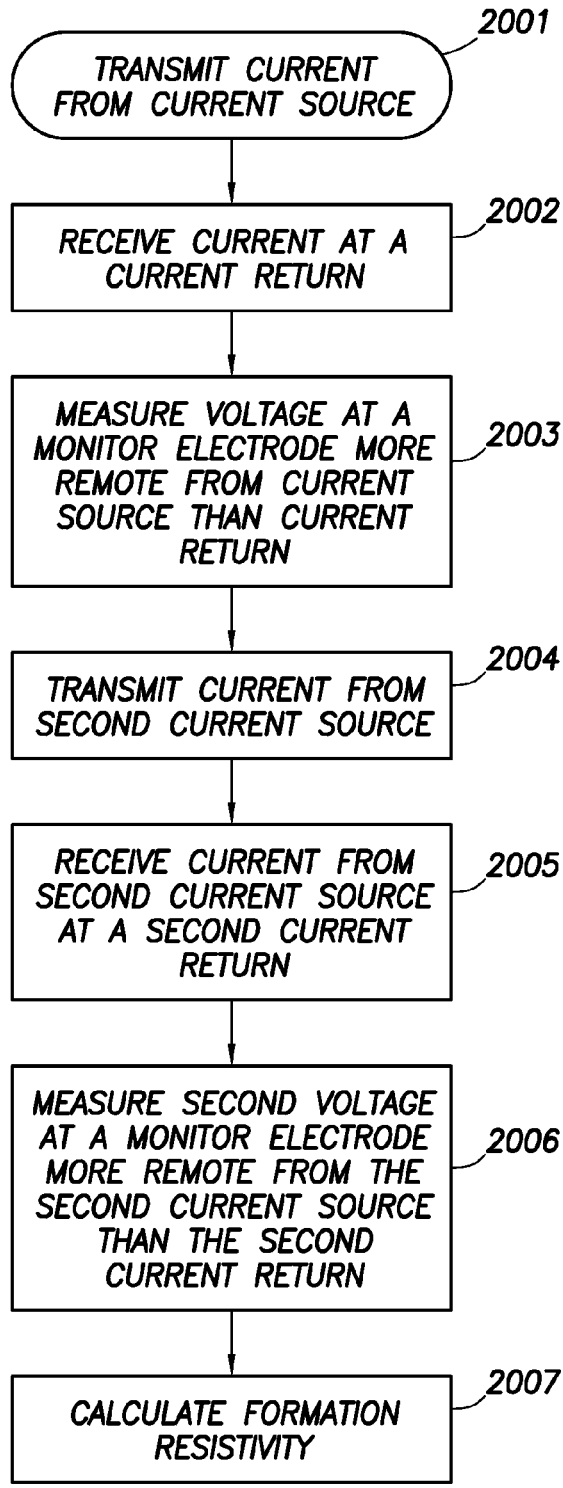
FIG. 20 is a flow diagram to implement a first oil base mud imager method according to one embodiment of the invention.
Figure 21:
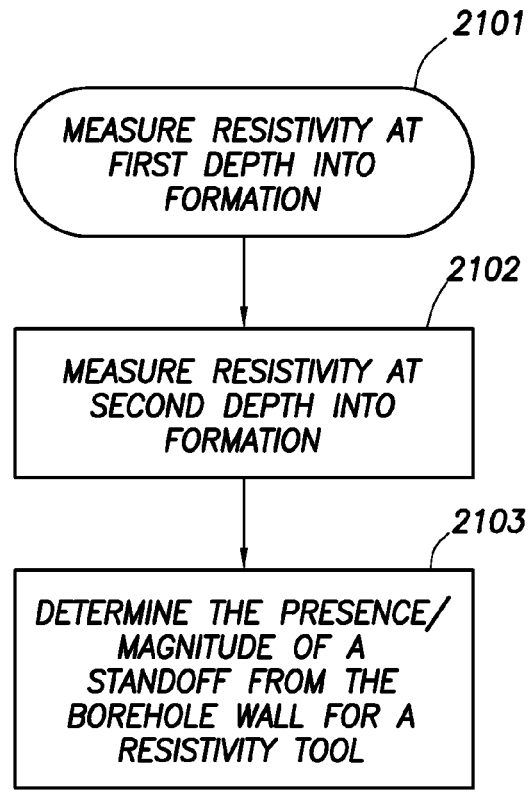
FIG. 21 is a flow diagram to implement a second method according to one embodiment of the invention.

The principles of the invention can also be used to detect the presence of a standoff as illustrated in FIG. 18. A composite of FIGS. 13 and 14 is shown in FIG. 18. First line 1010 shows the actual or ideal bed. As illustrated earlier, the tool may acquire data at a "shallow" depth of investigation and at a "deep" depth of investigation in the formation. In one embodiment of the invention, the shallow and the deep modes of investigation do not extend past the invaded zone. If there is no standoff from the borehole wall and/or no mud mudcake, the measured resistivity is that of the invaded zone, Rxo (i.e., the zone of the formation invaded by the drilling fluid). The presence of a mud cake or standoff means that the apparent resistivity at a single depth of investigation (as seen in conventional tools) may not accurately indicate the resistivity of the invaded formation behind the borehole wall.

As can be seen in FIG. 18, where there exists a stand off created by, e.g., a mud cake, or where contact with the borehole wall is less than ideal, a large difference (indicate this difference by a reference numeral) may exist in the tool response for the shallow and deep modes of operation. If the resistivity data taken by a tool in mode having a shallow depth of investigation closely aligns with the data taken by the tool in a mode having a deep depth of investigation (except for shoulder effects), then the operator can be confident that little or no standoff exists. Where little or no standoff exists, the measured resistivity is that of the formation surrounding the borehole (where there is an invaded formation, measured resistivity Rxo). It is therefore desirable for the resistivity tool to measure at multiple depths into the formation around the borehole between transmitters and receivers. This is the radial profiling of the formation.

The percentage difference between resistivity measurements at any point along the length of the borehole may be expressed as:

$$\frac{Rdeep - Rshallow}{Rdeep} \cdot 100 \quad [3]$$

If the percentage difference in the shallow and deep measurements in equation [3] is less than or equal to 10%, the resistivity measured by the tool is the resistivity of the invaded formation Rxo. If the percentage difference in the shallow and deep measurements in equation [3] is greater than 10%, a standoff exists between the tool and the invaded formation, or there is a mud cake present. In this case, an inversion scheme (well known by one having ordinary skill in the art) is executed to solve for the thickness of the mud cake or for the stand off distance.

Figure 15:
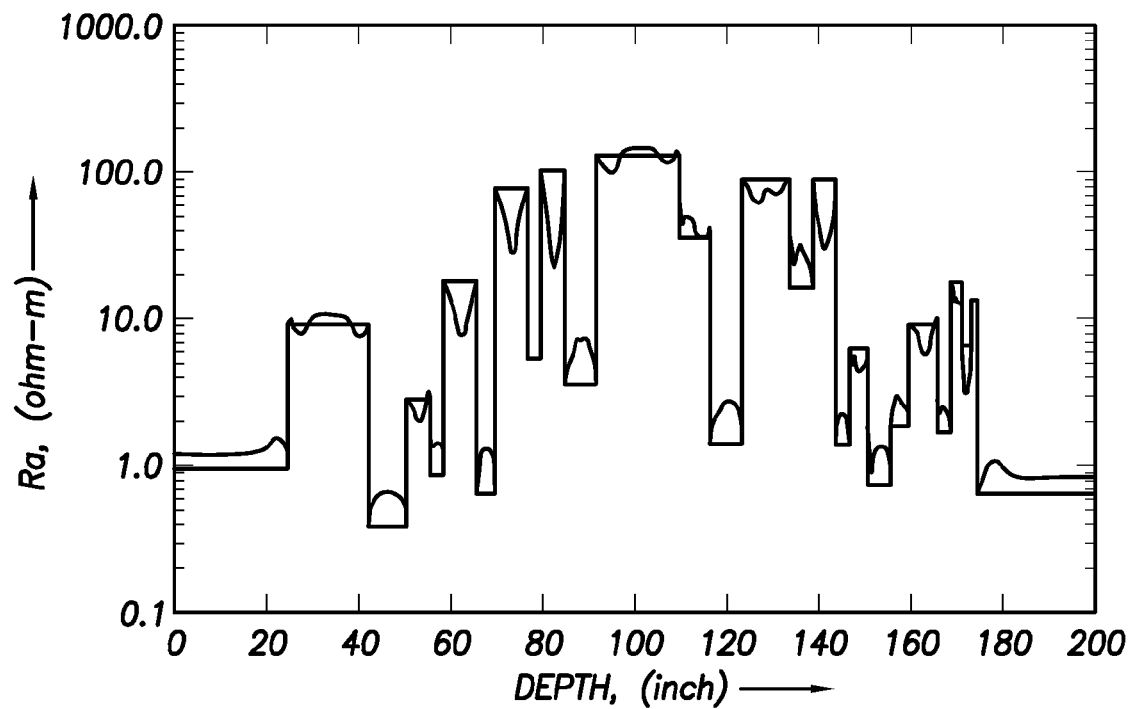
FIG. 15 is a plot of a modeled tool response for a prior art tool with a 1/32 inch stand off.

FIG. 15 illustrates a plot of the tool response for a conventional resistivity tool using the same formation used to generate FIGS. 10 and 11, but having a 1/32 inch standoff created by a 1000 ohm-m mud cake.

Figure 19:
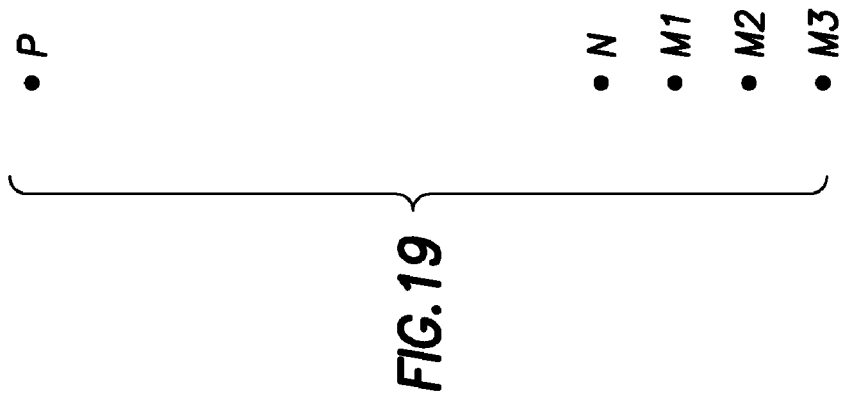
FIG. 19 is a point source illustration of an alternate embodiment of the invention having multiple mode.

Referring to FIG. 19, an alternate arrangement according to the invention is shown that investigates at multiple depths into the formation. Consistent with the principles of FIGS. 6A and 6B, FIG. 19 includes a current source N, a current return P, and a monitor electrode M1 not located between N and P. In addition, FIG. 19 includes a second monitor electrode M2 not between electrodes N and P and a further distance away from current source N and current return P than M1, and a third monitor electrode M3 even further out. The addition of the second electrode M2 enables measurement of a second depth into the formation. Addition of a third or more monitor electrode at different distances from the source (N) and receiver (P) electrodes generates additional depths of investigation. This principal may be combined with other teachings herein as well to create hybrid designs. As another aspect of the invention, existing resistivity tool designs may be modified so to detect $R_{xo}$ resistivities by adding one or more pairs of current sources and receptors in order to yield a multi-mode tool. In particular, placement of a monitor electrode outside of (i.e. not between) a source-receiver electrode pair is within the scope of one aspect of the invention. Prior art devices may be modified to include such a configuration.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, only a single monitor electrode is necessary, although a plurality may also be used in an effort to establish a good electrical contact with the borehole surface. Accordingly, the scope of protection is not limited to the embodiments described herein, but is only limited by the claims which follow, the scope of which shall include all equivalents of the subject matter of the claims.

What is claimed is:

1. An apparatus comprising:
   a first current source current return (CSCR) pair, said first CSCR pair comprises a first current source and a first current return, the first current return receives current from the first current source;
   a second CSCR pair, the second CSCR pair disposed along a longitudinal axis of said apparatus from the first CSCR pair, the second CSCR pair comprises a second current source and a second current return, and the second current return receives current from the second current source; and
   a monitor electrode disposed between the first CSCR pair and the second CSCR pair, a distance between the first current source and the monitor electrode is substantially equal to the distance between the second current source and the monitor electrode, and the monitor electrode monitors a first voltage and a second voltage.

2. The apparatus of claim 1 further comprising:
   a third current source disposed between the first current source and the first current return of the first CSCR pair; and
   a fourth current source disposed between the second current source and the second current return of the second CSCR pair.

3. The apparatus of claim 1 wherein the monitor electrode comprises an array of electrical contacts.

4. The apparatus of claim 1, wherein the first CSCR pair and the second CSCR pair comprises an array of electrical contacts.

5. An apparatus comprising:
   a first current source current return (CSCR) pair that comprises a current return disposed above a first current source, the first current return receives current from the first current source;
   a second CSCR pair disposed along a longitudinal axis of said apparatus from the first CSCR pair, the second CSCR pair comprises a second current return disposed below a second current source, the second current return receives current from the second current source; and a monitor electrode disposed between the first CSCR pair and the second CSCR pair, a distance between the first current source and the monitor electrode is substantially equal to the distance between the second current source and the monitor electrode, and the monitor electrode monitors the current transmitted by the current sources.

6. The apparatus of claim 5 wherein the monitor electrode comprises an array of electrical contacts.

7. The apparatus of claim 5 wherein the first and second current sources and the first and second current returns comprise an array of electrical contacts.

8. A compensated resistivity tool comprising:
a first current source;
a first current return disposed above the first current source, the first current source and first current return define a first current-source current-return (CSCR) pair;
a second current source disposed below the first current source;
a second current return disposed below the second current source, the second current source and second current return define a second CSCR pair;
a monitor electrode disposed between the first current source and the second current source, wherein a location of the monitor electrode defines a symmetry point between the first CSCR pair the second CSCR pair.

9. The compensated resistivity tool of claim 8 wherein the monitor electrode comprises an array of electrical contacts.

* * * * *